United States Patent
Loehr et al.

(10) Patent No.: US 11,672,021 B2
(45) Date of Patent: *Jun. 6, 2023

(54) TB SIZE MISMATCH DURING A RANDOM-ACCESS PROCEDURE

(71) Applicant: Lenovo (Singapore) Pte. Ltd., New Tech Park (SG)

(72) Inventors: Joachim Loehr, Wiesbaden (DE); Alexander Johann Maria Golitschek Edler von Elbwart, Darmstadt (DE); Prateek Basu Mallick, Dreieich (DE); Ravi Kuchibhotla, Chicago, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/461,642

(22) Filed: Aug. 30, 2021

(65) Prior Publication Data

US 2021/0392696 A1 Dec. 16, 2021

Related U.S. Application Data

(63) Continuation of application No. 16/535,889, filed on Aug. 8, 2019, now Pat. No. 11,109,417.

(Continued)

(51) Int. Cl.
*H04W 74/06* (2009.01)
*H04W 74/08* (2009.01)
(Continued)

(52) U.S. Cl.
CPC ... *H04W 74/0833* (2013.01); *H04W 28/0278* (2013.01); *H04W 72/0413* (2013.01); *H04W 72/10* (2013.01)

(58) Field of Classification Search
CPC ............. H04W 74/0833; H04W 76/27; H04W 52/0229; H04W 72/0413; H04W 72/14; H04W 28/0278; H04W 72/10
See application file for complete search history.

(56) References Cited

U.S. PATENT DOCUMENTS

2009/0259910 A1* 10/2009 Lee ................... H04W 74/0833
714/748
2017/0289995 A1* 10/2017 Lin ................... H04W 72/0413
(Continued)

FOREIGN PATENT DOCUMENTS

WO 2019241978 A1 12/2019
WO 2020056770 A1 3/2020

OTHER PUBLICATIONS

3GPP, "3rd Generation Partnership Project; Technical Specification Group Radio Access Network; NR; Medium Access Control (MAC) protocol specification (Release 15)", 3GPP TS 38.321 V15.2.0, Jun. 2018, pp. 1-73.

(Continued)

*Primary Examiner* — Shukri Taha
(74) *Attorney, Agent, or Firm* — Kunzler Bean & Adamson

(57) ABSTRACT

Apparatuses, methods, and systems are disclosed for handling transport block ("TB") size mismatch during RACH procedure. One apparatus includes a transceiver that receives a random access response message from a Radio Access Network ("RAN") entity, wherein the random access response message grants an uplink resource allocation to the apparatus. The apparatus includes a processor that determines a size mismatch between a stored TB and the uplink resource allocation, where the stored TB comprises at least one medium access control ("MAC") protocol data subunit ("subPDU"). In response to determining that there is a size mismatch, the processor generates a new TB that matches (Continued)

the size of the uplink resource allocation, wherein generating the new TB comprises appending at least one MAC sub-PDU.

19 Claims, 10 Drawing Sheets

Related U.S. Application Data

(60) Provisional application No. 62/716,281, filed on Aug. 8, 2018.

(51) Int. Cl.
*H04W 28/02* (2009.01)
*H04W 72/04* (2023.01)
*H04W 72/10* (2009.01)

(56) References Cited

U.S. PATENT DOCUMENTS

| | | |
|---|---|---|
| 2018/0270868 A1* | 9/2018 | Ou .................... H04W 72/042 |
| 2020/0059390 A1 | 2/2020 | Zhang et al. |
| 2020/0187245 A1 | 6/2020 | Fujishiro et al. |

OTHER PUBLICATIONS

3GPP, "3rd Generation Partnership Project; Technical Specification Group Radio Access Network; NR; Physical layer procedures for data (Release 15)", 3GPP TS 38.214 V15.2.0, Jun. 2018, pp. 1-95.
Ericsson, "UE Switch from CBRA to CFRA and possible issues", 3GPP TSG-RAN WG2 AH 1807 Tdoc R2-1810084, Jul. 2-Jul. 6, 2018, pp. 1-2.
Ericsson, "Corrections on CAC PCU handling when receiving a different grant size in RAR", 3GPP TSG-RAN WG2 AH 1807, Tdoc R2-1810086, Jul. 2- Jul. 6, 2018, pp. 1-4.
Lenovo, Motorola Mobility, "TB size mismatch when switching between CFRA and CBRA", 3GPP TSG-RAN WG2 Meeting #103, R2-1812206, Aug. 20-24, 2018, pp. 1-2.

* cited by examiner

TB SIZE MISMATCH DURING A RANDOM-ACCESS PROCEDURE

CROSS-REFERENCE TO RELATED APPLICATIONS

This application claims priority to co-pending U.S. patent application Ser. No. 16/535,889 entitled "TB SIZE MISMATCH DURING A RANSOM-ACCESS PROCEDURE" and filed on Aug. 8, 2019 for Joachim Loehr, Alexander Johann Maria Golitschek Edler von Elbwart, Prateek Basu Mallick, and Ravi Kuchibhotla, which is incorporated herein by reference. U.S. patent application Ser. No. 16/535,889 claims priority to U.S. Provisional Patent Application No. 62/716,281 entitled "TB SIZE MISMATCH FOR PUSCH TRANSMISSION SCHEDULED BY RAR" and filed on Aug. 8, 2018 for Joachim Loehr, Alexander Johann Maria Golitschek Edler von Elbwart, Prateek Basu Mallick, and Ravi Kuchibhotla, which is incorporated herein by reference.

FIELD

The subject matter disclosed herein relates generally to wireless communications and more particularly relates to handling the event of an existing TB not matching the size of a PUSCH resource allocation scheduled by a Random Access Response message during the Random-access procedure (also referred to as "RACH procedure").

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Access and Mobility Management Function ("AMF"), Positive-Acknowledgment ("ACK"), Access Stratum ("AS"), Base Station ("BS"), Binary Phase Shift Keying ("BPSK"), Bandwidth Part ("BWP"), Clear Channel Assessment ("CCA"), Cyclic Prefix ("CP"), Cyclical Redundancy Check ("CRC"), Channel State Information ("CSI"), Common Search Space ("CSS"), Connection Mode ("CM", this is a NAS state in 5GS), Core Network ("CN"), Control Plane ("CP"), Data Radio Bearer ("DRB"), Discrete Fourier Transform Spread ("DFTS"), Downlink Control Information ("DCI"), Downlink ("DL"), Downlink Pilot Time Slot ("DwPTS"), Dual Connectivity ("DC"), Dual Registration mode ("DR mode"), Enhanced Clear Channel Assessment ("eCCA"), Enhanced Licensed Assisted Access ("eLAA"), Enhanced Mobile Broadband ("eMBB"), Evolved Node-B ("eNB"), Evolved Packet Core ("EPC"), Evolved Packet System ("EPS"), EPS Mobility Management ("EMM", this is a NAS state in EPS), Evolved UMTS Terrestrial Radio Access ("E-UTRA"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Globally Unique Temporary UE Identifier ("GUTI"), Hybrid Automatic Repeat Request ("HARQ"), Internet-of-Things ("IoT"), International Mobile Subscriber Identity ("IMSI"), Licensed Assisted Access ("LAA"), Load Based Equipment ("LBE"), Listen-Before-Talk ("LBT"), Long Term Evolution ("LTE"), Multiple Access ("MA"), Mobility Management Entity ("MME"), Modulation Coding Scheme ("MC S"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), New Generation Node B ("gNB"), New Generation Radio Access Network ("NG-RAN", a RAN used for 5GS networks), New Radio ("NR"), Non-Access Stratum ("NAS"), Non-Orthogonal Multiple Access ("NOMA"), Operation and Maintenance System ("OAM"), Orthogonal Frequency Division Multiplexing ("OFDM"), Packet Data Unit ("PDU", used in connection with 'PDU Session'), Packet Switched ("PS", e.g., Packet Switched domain or Packet Switched service), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Public Land Mobile Network ("PLMN"), Quality of Service ("QoS"), Quadrature Phase Shift Keying ("QPSK"), Radio Access Network ("RAN"), Radio Access Technology ("RAT"), Radio Resource Control ("RRC"), Random-Access Channel ("RACH"), Random Access Response ("RAR"), Radio Network Temporary Identifier ("RNTI"), Reference Signal ("RS"), Registration Area ("RA", similar to tacking area list used in LTE/EPC), Registration Management ("RA", refers to NAS layer procedures and states), Remaining Minimum System Information ("RMSI"), Resource Spread Multiple Access ("RSMA"), Round Trip Time ("RTT"), Receive ("RX"), Radio Link Control ("RLC"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Session Management Function ("SMF"), Signal-to-Interference-Plus-Noise Ratio ("SINR"), Single Network Slice Selection Assistance Information ("S-NSSAI"), Single Registration mode ("SR mode"), Sounding Reference Signal ("SRS"), System Information Block ("SIB"), Synchronization Signal ("SS"), Supplementary Uplink ("SUL"), Tracking Area ("TA"), Transport Block ("TB"), Transport Block Size ("TB S"), Time-Division Duplex ("TDD"), Time Division Multiplex ("TDM"), Time Division Orthogonal Cover Code ("TD-OCC"), Transmission Time Interval ("TTI"), Transmit ("TX"), Unified Data Management ("UDM"), Uplink Control Information ("UCI"), User Entity/Equipment (Mobile Terminal) ("UE"), Uplink ("UL"), User Plane ("UP"), Universal Mobile Telecommunications System ("UMTS"), UMTS Terrestrial Radio Access ("UTRA"), UMTS Terrestrial Radio Access Network ("UTRAN"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

LTE RACH procedure includes a preamble transmission ("PRACH," also referred to as "Msg1") by the UE, a Random Access Response ("RAR," also referred to as "Msg2"). The RAR includes a UL resource allocation. In contention-based RACH procedure (also referred to as "CBRA"), the UE responds to the RAR with an Uplink transmission containing for example a connection request message (also referred to as "Msg3") using the UL resource allocation. A contention resolution message (also referred to as "Msg4") is sent from the network in response to the reception of RACH Msg3. In a contention-free RACH procedure (also referred to as "CFRA"), there is no need for RACH Msg3 and RACH Msg4.

Unlike LTE, a NR UE may end up switching between CFRA and CBRA based on the selected beam for each RA resource selection as the network is expected to allocate CFRA resources only to a subset of the beams in a cell. This can happen, e.g., during handover ("HO"), where the UE is configured with CFRA resources but at the time of Random Access resource selection, none of the SSBs having a configured CFRA resource are above the selection threshold. In this case the UE will fall back to CBRA resources where it is possible to select any SSB. If the CBRA fails contention resolution (if e.g. the selected SSB does not give sufficient quality), the UE will do a new Random Access resource selection which now may lead to successful SSB selection and CFRA. The switch from CBRA to CFRA is only applicable to UEs in RRC connected mode.

Switching from CFRA to CBRA (or vice versa) may result in a buffered TB, e.g., for Msg3. However, the stored TB may not match the size of an RAR grant when switching from CFRA to CBRA (or vice versa).

BRIEF SUMMARY

Herein, new UE behavior is described for avoiding the loss of data for cases when RAR grant size is not matching with the size of the TB Stored in the Msg3 buffer. Methods for handling TB size mismatch during RACH procedure are disclosed. Apparatuses and systems also perform the functions of the methods.

One method of a User Equipment ("UE") device for handling Transport Block ("TB") size mismatch during RACH procedure includes receiving a random access response message from a Radio Access Network ("RAN") entity and determining a size mismatch between a stored TB and the uplink resource allocation, where the stored TB comprises at least one medium access control ("MAC") protocol data subunit ("subPDU") and where the random access response message grants an uplink resource allocation to the UE. The method includes generating a new TB that matches the size of the uplink resource allocation in response to determining that there is a size mismatch.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
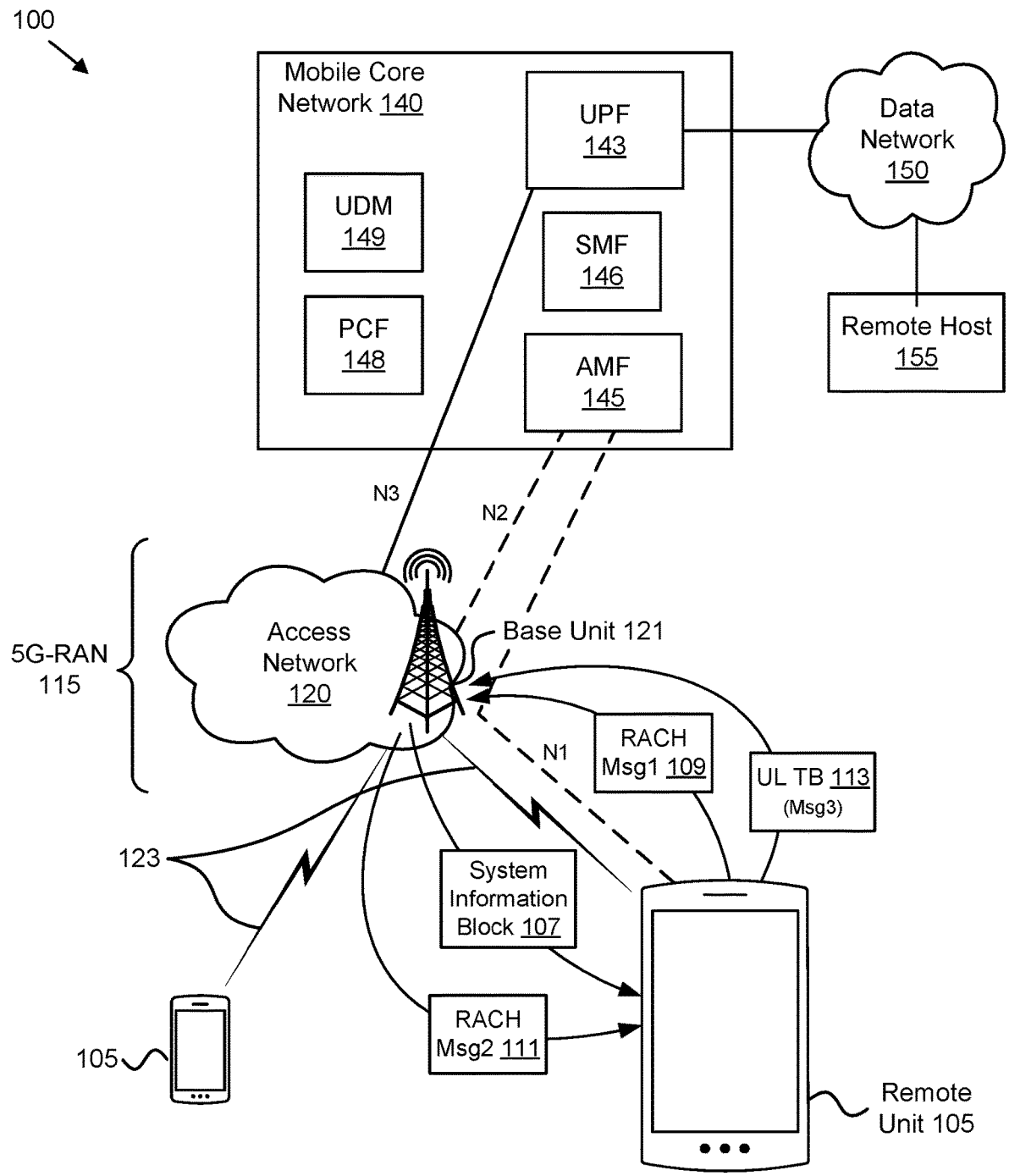
FIG. 1 is a schematic block diagram illustrating one embodiment of a wireless communication system for handling TB size mismatch during RACH procedure.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus that avoid the loss of data for cases when RAR grant size is not matching with the size of the TB Stored in the Msg3 buffer. As noted, a NR UE may end up switching between CFRA and CBRA based on the selected beam for each RA resource selection. Current random-access procedure specified for NR is described in 3GPP TS 38.321 v15.2.0.

When the UE applies CBRA and then switches to CFRA, the Msg3 has been already generated and stored in the Message 3 buffer, i.e. Msg3 buffer. According to TS 38.321 UE shall transmit a TB stored in the Msg3 buffer also for a CFRA, i.e. uplink transmission allocated by Random Access Response ("RAR") message. More in particular, the HARQ buffer is flushed when contention resolution fails and the MAC PDU transmitted in Message 3 is stored in the Msg3 buffer.

When the random-access procedure continues and a new RAR is received, since there is already a MAC PDU stored in the Msg3 buffer, irrespective of if it is a new CBRA or a CFRA, UE shall transmit this TB from the Msg3 buffer on the UL resources allocated by RAR. When the grant is received in the new RAR, the UE will deliver the uplink grant and the associated HARQ information to the HARQ entity (see e.g., Section 5.4.2.1 of 3GPP TS 38.321 v15.2.0). Hence, the MAC PDU from the Msg3 buffer will be obtained for transmission.

In the above case, if the grant provided in response to CFRA preamble transmission is equal in size to the grant provided earlier in response to CBRA preamble transmission, the MAC PDU in Msg3 buffer can naturally be transmitted in the provided grant. However, as there are two different preamble groups defined and as the network does not know if the UE even attempted CBRA before CFRA, it is not possible for the network to know which size of grant should be provided to the UE to avoid the issue with different grant size from the MAC PDU in Msg3 buffer. Hence, it is expected that the issue with different Msg3 grant sizes will be much more frequent in NR than it was in LTE.

However, for LTE the UE behavior for cases when RAR grant size is not matching with the size of the TB Stored in the Msg3 buffer is not specified, i.e., it is left to UE implementation. Because it is expected that the issue with different Msg3 grant sizes will be much more frequent in NR than it was in LTE, the present disclosure provides different solutions which avoid the loss of data for cases when RAR grant size is not matching with the size of the TB Stored in the Msg3 buffer.

According to a first solution, the UE triggers a RLC retransmission for each of the RLC PDUs that are contained in the TB stored in the Msg3 buffer upon receiving an UL grant within the Random Access Response (RAR) message which is not fitting the size of a Transport Block (TB) stored in the Msg3 buffer. Subsequently, the UE generates a new TB which will include (e.g., at least part of) the RLC retransmissions. Then, according to the specified LCP procedure, the UE considers the triggered RLC retransmissions for the generation of the new TB.

According to a second solution, the UE takes the TB from the Msg3 buffer and extends it in order to adapt the size to the received UL grant upon receiving an UL grant within the CFRA RAR which is larger than the size of the TB stored in Msg3 buffer. Since padding, i.e. MAC subPDU with padding, if present will be always placed at the end of a transport Block, a UE according to this embodiment adds a MAC subPDU including padding at the end of the TB which is stored in the Msg3 buffer and delivers the newly generated TB to the corresponding HARQ process used for the UL transmission. The size of the MAC subPDU including padding is the difference between the size of the TB stored in the Msg3 buffer and the TB size indicated within the RAR UL grant.

According to a third solution, a UE may receive an UL grant within the RAR indicating a TB size that is smaller than the size of the TB stored in Msg3 buffer—generates a new TB by invoking LCP procedure according to the received RAR UL grant. Said generated TB contains an indication providing to the base station the information that there is data stored in Msg3 buffer requiring a bigger grant size than the RAR UL grant size for transmission.

According to a fourth solution, for the case that the CFRA RAR UL grant is smaller than the original CBRA RAR grant (so that the TB in the Msg3 buffer is too large), the UE does not follow the RAR grant, but instead transmits another preamble, thus restarting the RACH procedure. Here, the UE trusts that the new RAR grant will be large enough to carry the TB in the Msg3 buffer. Procedurally, this behavior may be evoked if the UE considers the Random Access Response reception not successful, and therefore subsequently incrementing the preamble transmission counter by 1, and in case the maximum number of preamble transmissions has not been exceeded performing the random access resource selection procedure.

FIG. 1 depicts a wireless communication system 100 for handling TB size mismatch during RACH procedure, according to embodiments of the disclosure. In one embodiment, the wireless communication system 100 includes at least one remote unit 105, a 5G-RAN 115, and a mobile core network 140. The 5G-RAN 115 and the mobile core network form a mobile communication network. The 5G-RAN 115 may be composed of an access network 120 containing at least one base unit 121. The 5G-RAN 115 may include a 3GPP access network and/or a non-3GPP access network (e.g., Wi-Fi).

The remote units 105 communicate with the 5G-RAN 115 using a wireless communication links 123. For example, a remote unit 105 may communicate with a 3GPP access network using 3GPP communication links and may communicate with a non-3GPP access network using non-3GPP communication links. Even though a specific number of remote units 105, access networks 120, base units 121, wireless communication links 123, and mobile core networks 140 are depicted in FIG. 1, one of skill in the art will recognize that any number of remote units 105, access networks 120, base units 121, communication links 123, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 121 in the 3GPP access network 120 via uplink ("UL") and downlink ("DL") communication signals. Furthermore, the UL and DL communication signals may be carried over the 3GPP communication links 123. Here, the access networks 120 is an intermediate network that provide the remote units 105 with access to the mobile core network 140.

In some embodiments, the remote units 105 communicate with a remote host 155 via a network connection with the mobile core network 140. For example, an application in a remote unit 105 (e.g., web browser, media client, telephone/ VoIP application) may trigger the remote unit 105 to establish a PDU session (or other data connection) with the mobile core network 140 using the 5G-RAN 115 (e.g., a access network 120). The mobile core network 140 then relays traffic between the remote unit 105 and the data network 150 (e.g., remote host 155) using the PDU session. Note that the remote unit 105 may establish one or more PDU sessions (or other data connections) with the mobile core network 140. As such, the remote unit 105 may have at least one PDU session for communicating with the data network 150. The remote unit 105 may establish additional PDU sessions for communicating with other data network and/or other remote hosts.

The base units 121 may be distributed over a geographic region. In certain embodiments, a base unit 121 may also be referred to as an access terminal, an access point, a base, a base station, a Node-B, an eNB, a gNB, a Home Node-B, a relay node, a device, or by any other terminology used in the art. The base units 121 are generally part of a radio access network ("RAN"), such as the 5G-RAN 115, that may include one or more controllers communicably coupled to one or more corresponding base units 121. These and other elements of radio access network are not illustrated but are well known generally by those having ordinary skill in the art. The base units 121 connect to the mobile core network 140 via the access network 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121.

In one embodiment, the mobile core network 140 is a 5G core ("5GC") or the evolved packet core ("EPC"), which may be coupled to a data network (e.g., the data network 150), such as the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs"). Here, the mobile core network 140 includes at least one UPF 143 that serves the access network 120. The mobile core network 140 also includes multiple control plane functions including, but not limited to, an Access and Mobility Management Function ("AMF") 145 that serves the access network 120, a Session Management Function ("SMF") 146, a Policy Control Function ("PCF") 148, and a Unified Data Management function ("UDM") 149. In certain embodiments, the mobile core network 140 may also include an Authentication Server Function ("AUSF"), a Network Repository Function ("NRF") (used by the various NFs to discover and communicate with each other over APIs), or other NFs defined for the 5GC.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like.

In various embodiments, the mobile core network 140 supports different types of mobile data connections and different types of network slices, wherein each mobile data connection utilizes a specific network slice. The different network slices are not shown in FIG. 1 for ease of illustration, but their support is assumed.

In various embodiments, the remote unit 105 may synchronize to a cell of a base unit 121 and receive a system information block 107 indicating various capabilities and parameters of the cell. The remote unit 105 later determines to initiate a RACH procedure and sends a RACH Msg1 109 (e.g., PRACH preamble) to the base unit 121. In response, the base unit 121 may send a RACH Msg2 111 (e.g., random access response messages) to the remote unit 105. The RACH Msg2 111 includes a grant of uplink resources. The remote unit 105 transmits an uplink TB 113 in Msg3.

As noted above, where the remote unit 105 ends up switching between CFRA and CBRA, there may be a mismatch between the size of a TB stored in the Msg3 buffer and the size of a PUSCH resource allocation granted by Msg2. As described in greater detail below, the remote unit 105 may regenerate the TB to be sent in Msg3. Alternatively, the remote unit 105 may restart the RACH procedure or send an indication to the base unit 121 of pending data requiring a larger UL grant.

The embodiments described herein are mostly described in the context of licensed cells, e.g., NR or LTE, however the embodiments are also applicable in the context of unlicensed transmission/cell, e.g., NR-U. Likewise, the principles of the solutions and embodiments may be applied to any RACH procedure where TB size mismatch is a possibility.

Figure 2:
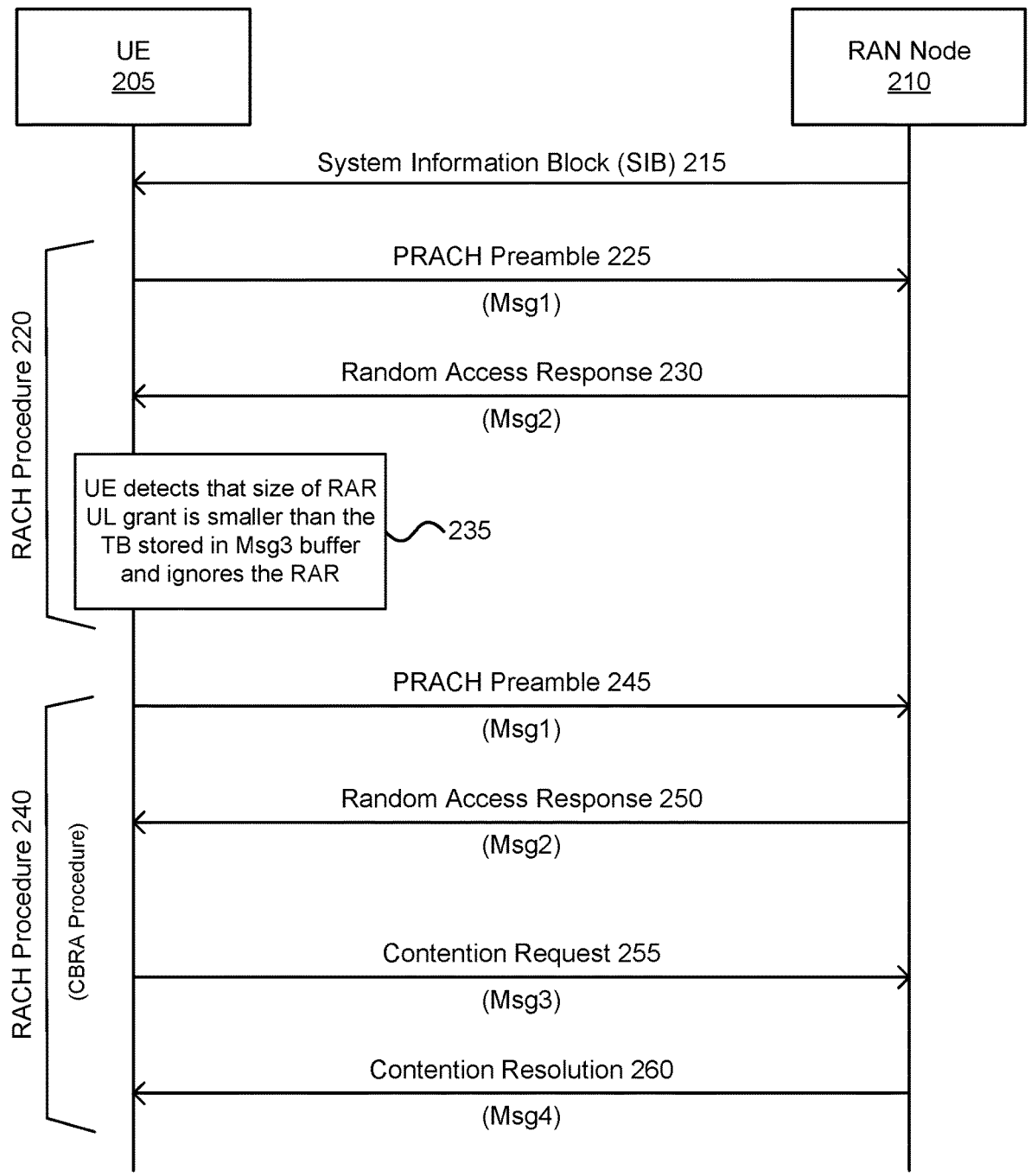
FIG. 2 is a diagram illustrating a first embodiment of a signaling flow for RACH procedure.

FIG. 2 depicts a signaling flow 200 between a UE 205 and a RAN node 210, according to embodiments of the disclosure. The RAN node 210 broadcasts a system information block (SIB) 215, which the UE 205 receives. The UE 205 uses information in the SIB 215 to configure itself for the RACH procedure 220. The UE then sends a PRACH preamble 225, referred to as Msg1 of a RACH procedure. The RAN node 210 receives the PRACH preamble 225 and sends a Random Access Response ("RAR") 230, referred to as Msg2 of the RACH procedure. The UE 205 listens for the RAR 230 during a Random Access Response window (ra-ResponseWindow). The Random Access Response (RAR) message 230 has the same content for CBRA and CFRA procedures.

In the depicted embodiment, the UE 205 detects that the size of the UL grant within RAR 230 (e.g., Msg2) is smaller than the size of a TB in the Msg3 buffer. According to the fourth solution described above, for the case that the RAR UL grant is smaller than the TB stored in the Msg3 buffer, the UE 205 may ignore the RAR UL grant (see block 235), and instead transmit another PRACH preamble (see messaging 245), thus terminating the initial RACH procedure 220 and starting the RACH procedure 240.

Here, the UE trusts that the new RAR 250 will include a UL grant large enough to carry the TB in the Msg3 buffer. Procedurally, this behavior may be evoked by the UE 205 considering the Random Access Response 230 reception not successful, and therefore subsequently incrementing the preamble transmission counter by 1, and in case the maximum number of preamble transmissions has not been exceeded performing the random access resource selection procedure.

In a CBRA procedure, the UE 205 sends a uplink transmission 255, referred to as Msg3 of the RACH procedure. One example of a Msg3 is an RRC Connection Request. The RAN node 210 sends a contention resolution message 260 to the UE, referred to as Msg4. Here, the Msg4 may include a Contention resolution MAC CE for the UE 205. Note however, that in CFRA there is Msg1 and Msg2, but there is no need for contention resolution (e.g., Msg3 and Msg4). Rather, during the CFRA the UE 205 is allocated a RACH preamble and/or RACH resource, e.g. by means of a PDCCH order. A CFRA is e.g., used for cases like Handover, uplink Timing alignment as well as Beam failure recovery.

Figure 3:
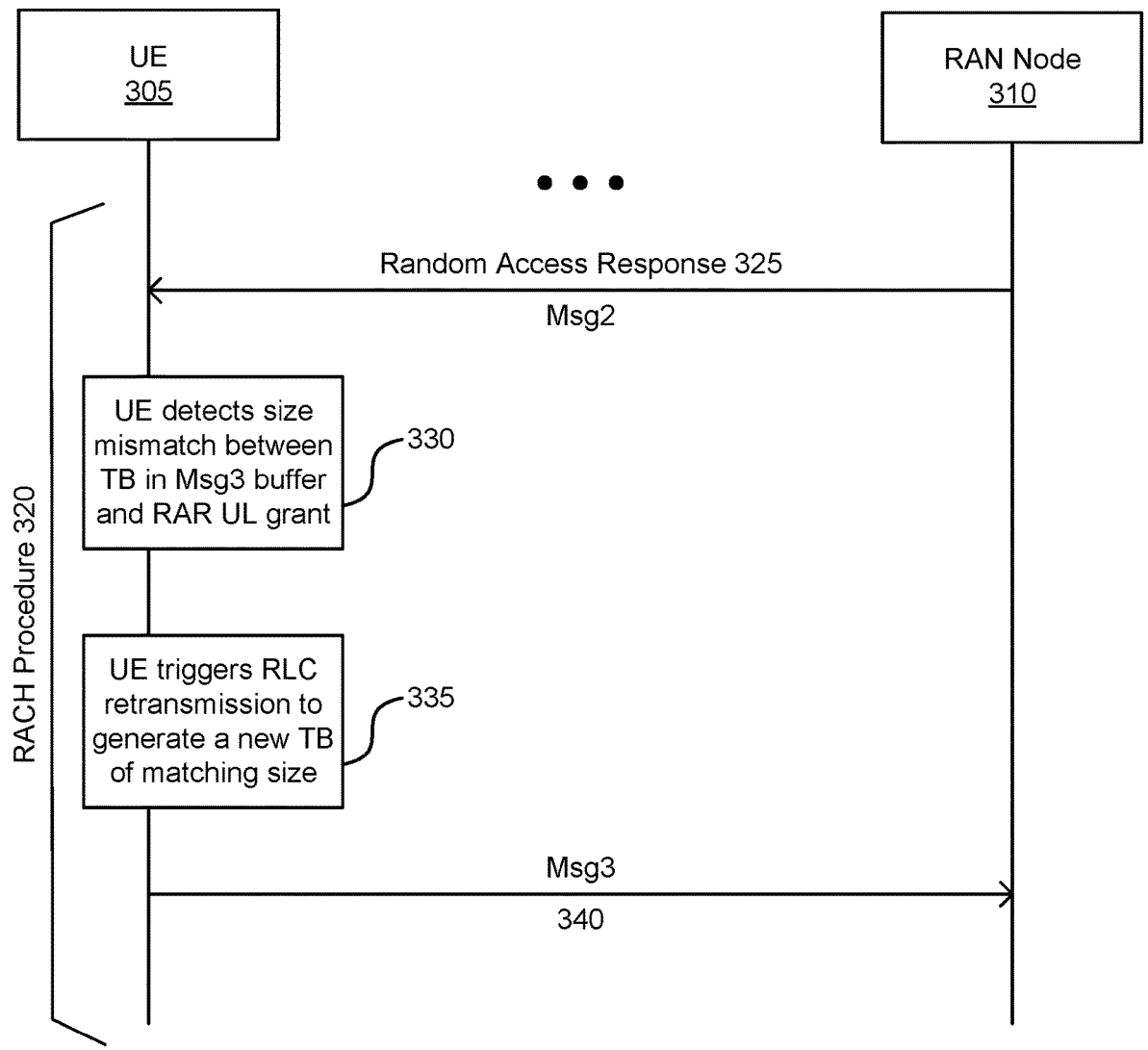
FIG. 3 is a diagram illustrating a second embodiment of a signaling flow for RACH procedure.

FIG. 3 depicts a signaling flow 300 between a UE 350 and a RAN node 310, according to embodiments of the disclosure. The signaling flow 300 depicts a portion of a RACH procedure 320, wherein the UE 305 receives a Random Access Response (RAR) message 325. Here, where the UE 305 detects a size mismatch between a TB in the Msg3 buffer and the UL grant within Msg2 (see block 330).

According to the first solution described above, when receiving an UL grant within the RAR message 325 which is not fitting the size of a transport Block (TB) stored in the Msg3 buffer, the UE 305 triggers a RLC retransmission for each of the RLC PDUs that are contained in the TB stored in the Msg3 buffer (see block 335). Subsequently, the UE 305 generates a new TB which will include (e.g., at least part of) the RLC retransmissions. Then, according to the specified LCP procedure, the UE 305 considers the triggered RLC retransmissions for the generation of the new TB.

In various embodiments, the UE 305 does not wait for an RLC status report from the receiver triggering an RLC retransmission. Rather, the UE 305 autonomously triggers (e.g., internally) a RLC retransmission for the RLC PDUs of those logical channels ("LCHs") which are configured with RLC AM mode. That is, the MAC entity in the UE 305 indicates to the relevant RLC entities to trigger a RLC retransmission for the RLC PDUs contained in TB from Msg3 buffer. This transmitter-initiated RLC retransmission greatly reduces delay in generating the new TB as compared to waiting for an RLC status report to trigger RLC retransmission.

The MAC/RLC protocol then ensures that the retransmissions are prioritized over new RLC PDUs and multiplexed into the new TB scheduled by the RAR UL grant. Beneficially, triggering RLC retransmissions autonomously upon reception of an RAR UL grant which is not matching the size of the TB stored in Msg3 buffer allows the UE 305 to generate a new TB according the received UL grant size without losing the data contained in the TB stored in the Msg3 buffer. The UE 305 sends the new TB in Msg3 340.

Even though RLC retransmissions can be only triggered for RLC AM mode, for most of the cases the data within RACH Msg3 will be data of RLC AM LCHs, e.g., Handover complete message. Because the UE 305 generates a new TB by invoking the Logical channel prioritization (LCP) procedure, when the CFRA grant size, i.e. size of RAR UL grant for CFRA, is not matching the size of the TB stored in Msg3 buffer, the first solution may be applied, e.g., both for cases when the grant in the RAR (CFRA) is larger than the MAC PDU in the Msg3 buffer as well as for cases when the grant in the RAR (CFRA) is smaller than the MAC PDU in the Msg3 buffer.

Figure 4:
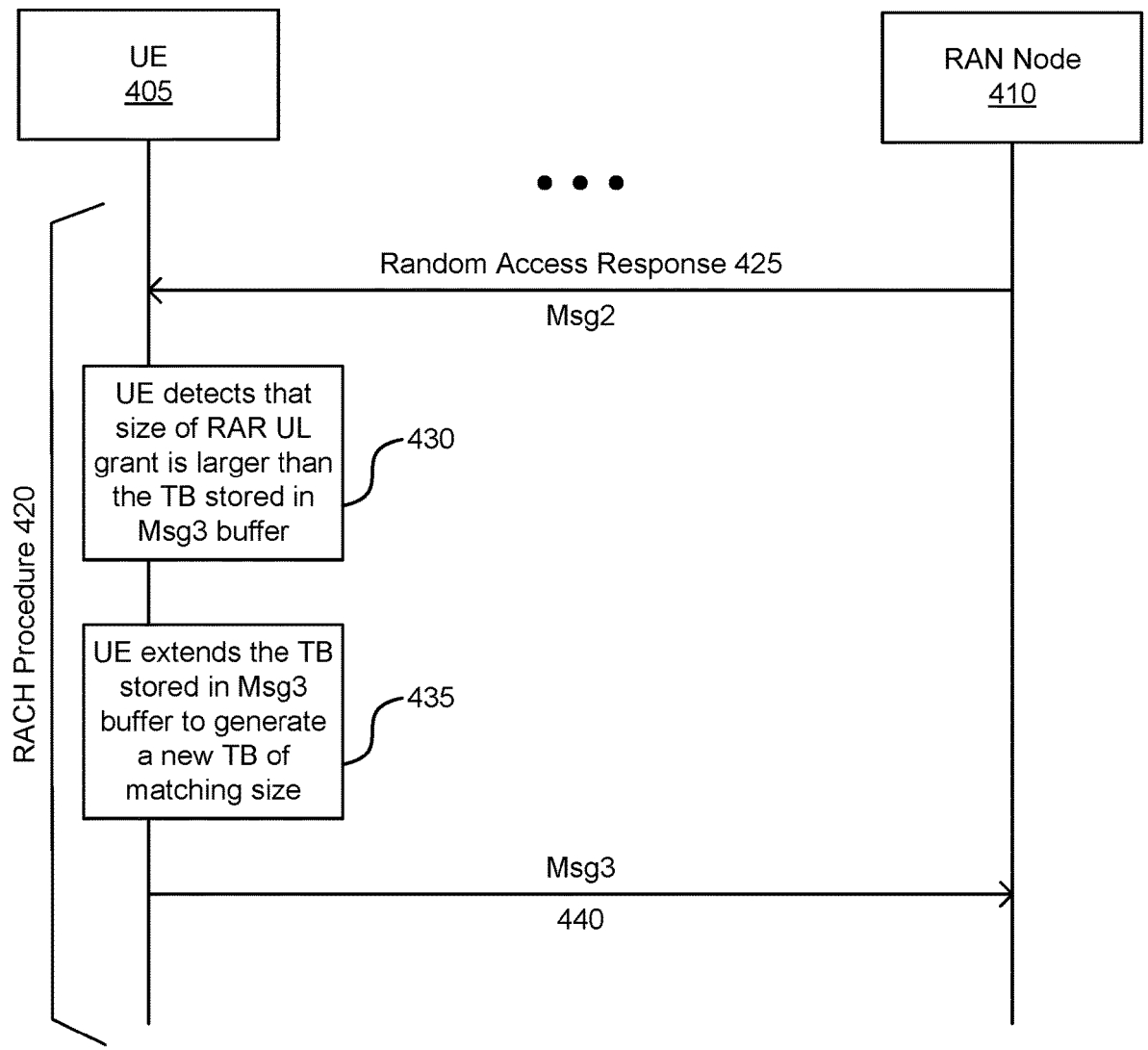
FIG. 4 is a diagram illustrating a third embodiment of a signaling flow for RACH procedure.

FIG. 4 depicts a signaling flow 400 between a UE 405 and a RAN node 410, according to embodiments of the disclosure. The signaling flow 400 depicts a portion of a RACH procedure 420, wherein the UE 405 receives a Random Access Response (RAR) message 425. Here, where the UE 405 detects a size mismatch between a TB in the Msg3 buffer and the UL grant within Msg2 (see block 430).

According to the second solution described above, the UE 405 extends the TB stored in Msg3 buffer to match the size of the UL grant (see block 435). In one embodiment, the UE 405 appends padding to the end of the TB stored in Msg3 buffer and delivers the padded TB to the RAN node 210. In another embodiment, the UE 405 generates an additional TB to append to the end of the TB stored in Msg3 buffer and delivers the combined TB to the RAN node 210. Moreover, the UE 405 may remove portions of the stored TB, as described in further detail below.

Figure 5:
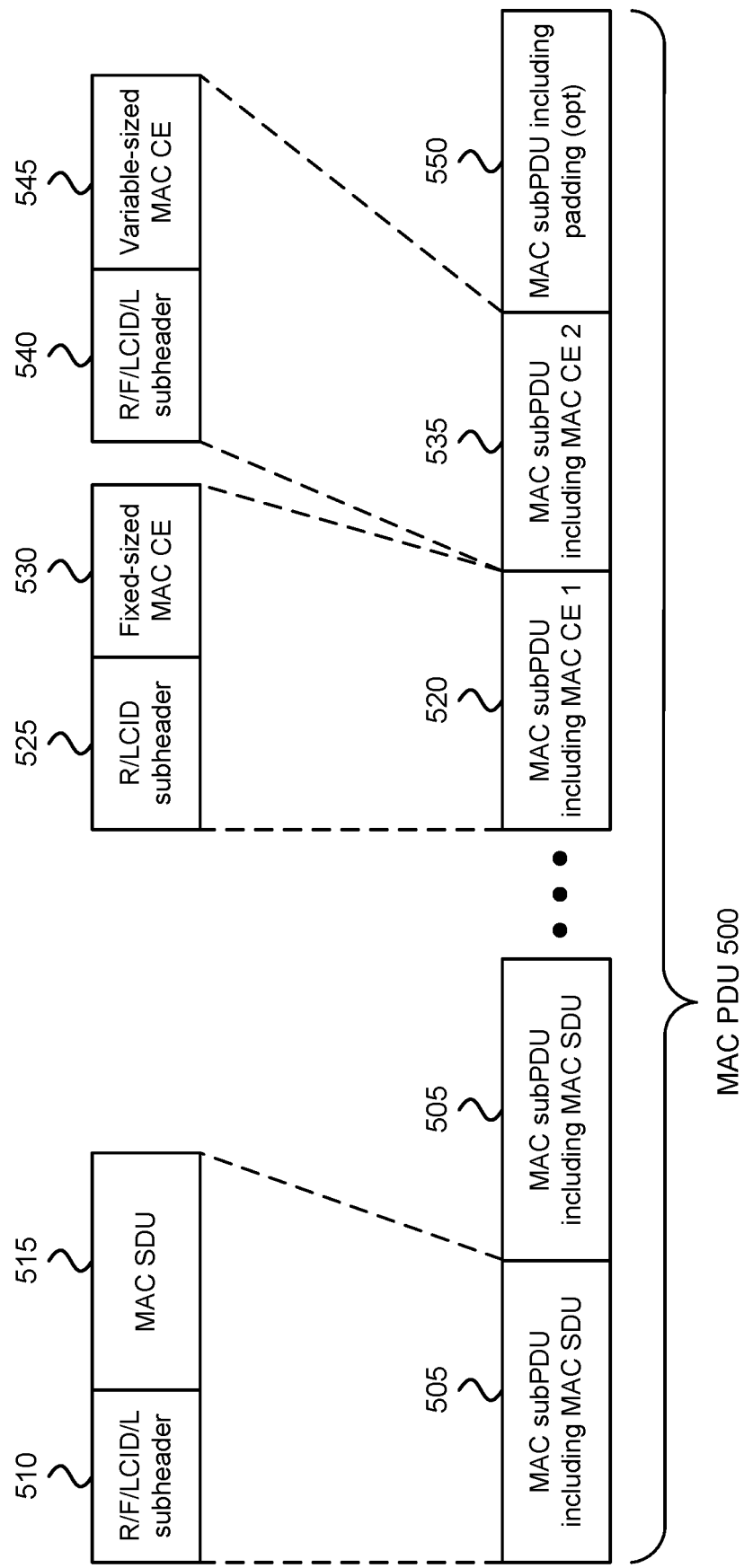
FIG. 5 is a block diagram illustrating a UL MAC PDU.

FIG. 5 depicts an exemplary UL MAC PDU 500, according to embodiments of the disclosure. Note that the UL MAC PDU 500 is composed of multiple MAC subPDUs. Here, the depicted UL MAC PDU 500 contains multiple MAC subPDUs 505 which include a subheader 510 and MAC SDU 515, at least one MAC subPDU 520 including a subheader 525 and fixed-size MAC MAC CE 530, at least one MAC subPDU 535 including a subheader 540 and variable-size MAC MAC CE 545, and optionally includes a MAC subPDU 550 with padding.

Referring again to FIG. 4, when receiving an UL grant within the RAR 425 which is larger than the size of the TB stored in Msg3 buffer, the UE 405 takes the TB from the Msg3 buffer and extends it to fit the received UL grant. In one embodiment, the UE 405 adds padding in the end of the TB in order to adapt the size to the received UL grant. This may be accomplished by adding a MAC subPDU 550 with padding of sufficient size to match the received UL grant.

Since padding, e.g., MAC subPDU with padding 550, if present will be always placed at the end of a Transport Block after any MAC SDUs and MAC CEs, according to one implementation of the second solution the UE 405 adds the MAC subPDU including padding 550 at the end of the TB which is stored in the Msg3 buffer and delivers the newly generated TB to the corresponding HARQ process used for the UL transmission. Here, the size of the MAC subPDU including padding 550 is equal to the difference between the size of the TB stored in the Msg3 buffer and the TB size indicated within the RAR UL grant.

In this implementation of the second solution, the UE 405 does not consider data of any LCH—for cases when there is data available for transmission for a configured LCH at the time when the UE receives RAR UL grant—in order to adapt the size of the TB stored in the Msg3 buffer to the received UL grant size. In other words, in this implementation the UE 450 only adds padding to the end of the TB stored in Msg3 buffer even though there might be some (high priority) data pending in the UE 405 for transmission.

In other implementations of the second solution, for cases when the TB size indicated in the UL grant in the RAR 425 (e.g., CFRA RAR) is smaller than the MAC PDU in the Msg3 buffer, the UE 405 may generate a new TB by invoking LCP procedure. Here, the size of this new TB is the TB size indicated in the RAR UL grant. Note however that this may potentially result in losing data contained in the TB in Msg3 buffer by relying on RLC retransmission for RLC AM mode.

In a variant to the second solution, if the UE 405 receives an UL grant within the RAR 425 which is larger than the size of the TB stored in Msg3 buffer, then the UE 405 extends the stored TB by generating a second TB by invoking LCP and combining the two TBs. Here, the size of this new TB is the difference between the TB size indicated in the RAR UL grant and the size of the TB stored in Msg3 buffer. Subsequently, the UE 405 appends the newly generated TB to the TB stored in the Msg3 buffer and delivers the combined TB to the corresponding HARQ process for transmission.

In another variant to the second solution, if the UE 405 receives an UL grant within the RAR 425 which is larger than the size of the TB stored in Msg3 buffer, then the UE 405 also generates a second (new) TB by invoking LCP procedure. Here, however, the size of this new TB is the size of the TB indicated within the RAR UL grant minus the size of the TB stored in Msg3 buffer, excluding any padding MAC subPDU 550 (if present), i.e., only the size of MAC SubPDUs including MAC SDU 505 or MAC SubPDUs including MAC CE are considered. The UE 405 subsequently may remove the MAC subPDU including padding 550 (if present) from the TB stored in Msg3 buffer and append the new generated TB to form a combined TB which is then delivered to the corresponding HARQ process for transmission.

Note that the RAN node 410 may assume that padding—if present—is located at the end of the TB. Thus, the UE 405 may remove a padding MAC subPDU from the TB stored in the Msg3 buffer to conform with RAN expectations. The UE 405 may according to a certain implementation further change the order of the MAC subPDUs within the combined TB (i.e., the TB stored in Msg3 buffer+the newly generated TB) in order to be compliant with a specified MAC PDU format. For example, MAC CEs subPDUs may need to be relocated, i.e. placed after any MAC SDU subPDU 505, in the combined TB. Alternatively, the UE 405 may be allowed to place UL MAC CEs also before MAC SDUs in order to further decrease UE complexity, i.e. avoiding the need to replace MAC subPDUs in the combined TB.

In a third variant to the second solution, the UE 405 may receive an UL grant within the RAR 425 which is larger than the size of the TB stored in Msg3 buffer and generate a new (second) TB by invoking LCP procedure. Here, the size of this new TB is the size of the TB indicated within the RAR UL grant minus the size of the TB stored in Msg3 buffer excluding any padding MAC subPDU 550 and MAC subPDU(s) containing a MAC CE (e.g., MAC subPDUs 520 or 535). The UE 405 subsequently removes any MAC subPDU including padding 550 and MAC CE (if present) from the TB stored in Msg3 buffer, i.e. only MAC subPDU(s) containing MAC SDUs are considered, and appends the new generated TB to form a combined TB which is then delivered to the corresponding HARQ process for transmission.

In the third variant, one or more of the MAC CEs may be outdated (e.g., due to delays associated with RACH procedure fallback). The UE 405 may then include regenerated (e.g., updated) MAC CEs in the second TB generated. An additional reason to remove padding MAC subPDU and MAC CE from the TB stored in the Msg3 buffer is to ensure that a UL MAC CE and padding—if present—is placed after any MAC SDU, and thus placed at the end of the combined TB.

Figure 6:
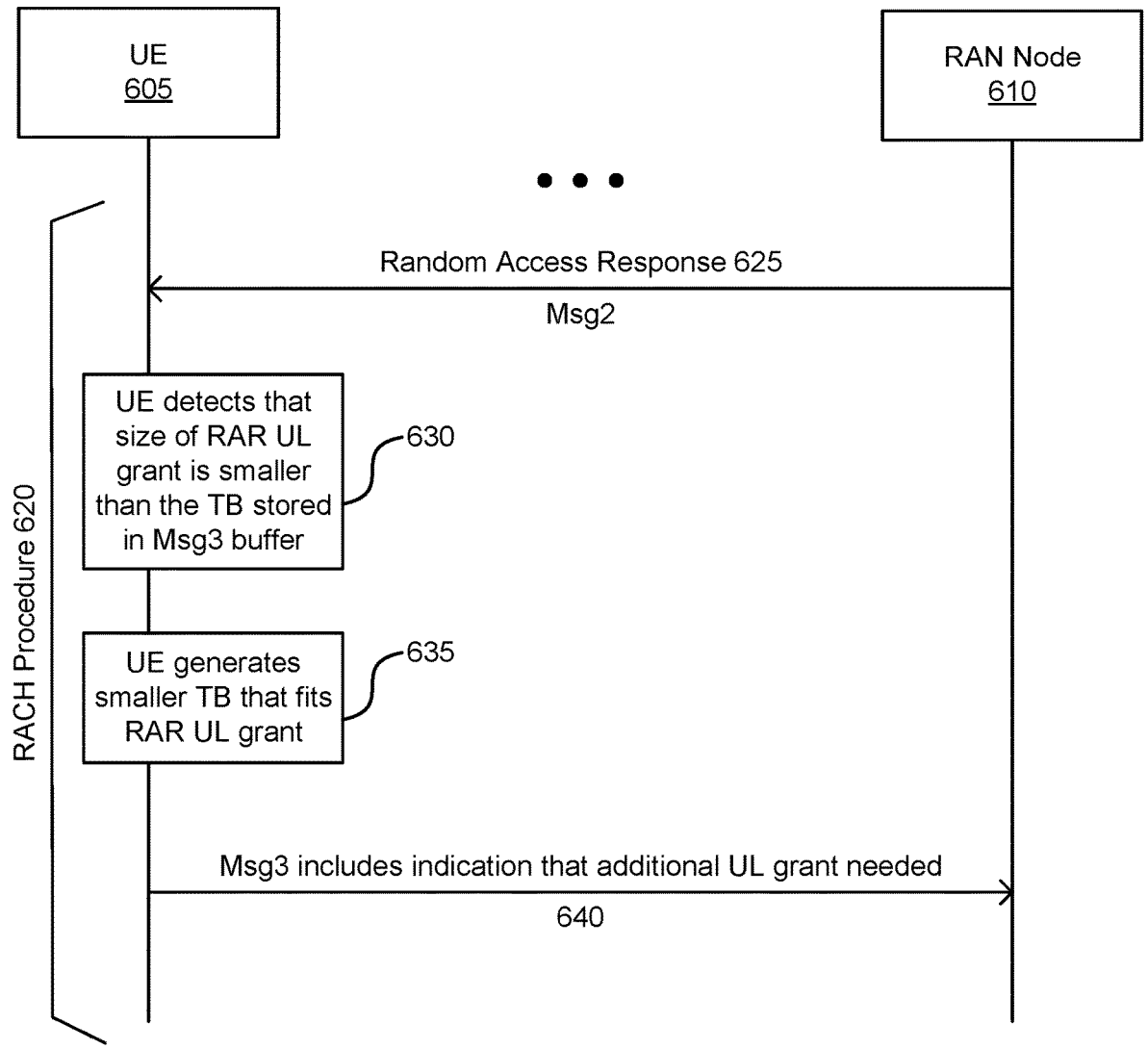
FIG. 6 is a diagram illustrating a fourth embodiment of a signaling flow for RACH procedure.

FIG. 6 depicts a signaling flow 600 between a UE 605 and a RAN node 610, according to embodiments of the disclosure. The signaling flow 600 depicts a portion of a RACH procedure 620, wherein the UE 605 receives a Random Access Response (RAR) message 625. Here, where the UE 605 detects a size mismatch between a TB in the Msg3 buffer and the UL grant within Msg2. A key distinction is that in the signaling flow 600, the UE 605 detects that the size of the UL grant within Msg2 (e.g., RAR 625) is smaller than the size of a TB in the Msg3 buffer (see block 630).

As mentioned above, according to the third solution, a UE 605 generates a new (smaller) TB by invoking LCP procedure according to the received RAR UL grant. Here, the new TB is sized to match the RAR UL grant (see block 635). In various embodiments, said generated TB contains an indication providing to the RAN node 610 the information that there is data stored in Msg3 buffer of the UE 605 requiring a bigger grant size than the RAR UL grant size for transmission.

In one implementation of the third solution, the UE 605 includes a BSR MAC CE in the new TB which indicates the size of the RLC data contained in the Msg3 buffer. Note that according to the current NR/LTE specification (e.g., 3GPP Rel-15) a buffer status report would not account for data which has been already formed into a Transport Block. In an alternative implementation, a one-bit flag is introduced in the TB transmitted in response the RAR UL grant indicating that there is pending data in the Msg3 buffer which requires a larger grant size than the RAR UL grant received. Such flag may be conveyed within the MAC header or a MAC subheader.

Upon receiving an UL grant which is sufficiently large enough to carry the TB stored in Msg3 buffer, the UE 605 obtains the TB from the Msg3 buffer and transmits it. In certain embodiments, the UE 605 transmits the TB from the Msg3 buffer even for cases where the UL grant was not received within an RAR message, e.g. any dynamic UL grant addressed to the C-RNTI. In contrast, according to current NR/LTE specification, the UE 605 only obtains a TB from Msg3 when the uplink grant was received in a Random Access Response. Note that in case the TB size indicated by the new UL grant is larger than size of the TB stored in Msg3 buffer, the UE 605 may append a padding MAC subPDU in the end of the TB or apply any other solution as described in the second solution.

Figure 7:
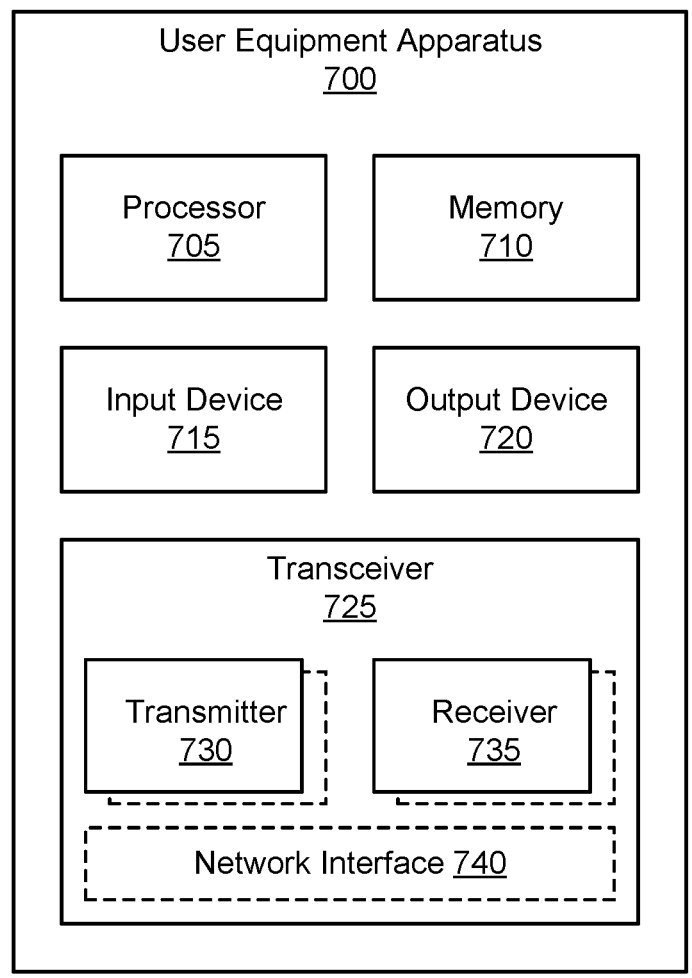
FIG. 7 is a schematic block diagram illustrating one embodiment of a user equipment apparatus that may be used for handling TB size mismatch during RACH procedure.

FIG. 7 depicts one embodiment of a user equipment apparatus 700 that may be used for handling TB size mismatch during RACH procedure, according to embodiments of the disclosure. The user equipment apparatus 700 may be one embodiment of the remote unit 105. Furthermore, the user equipment apparatus 700 may include a processor 705, a memory 710, an input device 715, an output device 720, a transceiver 725. In some embodiments, the input device 715 and the output device 720 are combined into a single device, such as a touch screen. In certain embodiments, the user equipment apparatus 700 does not include any input device 715 and/or output device 720.

As depicted, the transceiver 725 includes at least one transmitter 730 and at least one receiver 735. Here, the transceiver 725 communicates with a mobile core network (e.g., a 5GC) via an access network, e.g., containing a RAN node. Additionally, the transceiver 725 may support at least one network interface 740. Here, the at least one network interface 740 facilitates communication with an eNB, gNB, or other RAN node (e.g., using the "Uu" interface). Additionally, the at least one network interface 740 may include an interface used for communications with an UPF, an SMF, and/or a P-CSCF.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the transceiver 725 receives a RAR message from a base unit (e.g., base unit 121, RAN node 210, RAN node 310, RAN node 410, and/or RAN node 610) during a random-access procedure, wherein the random access response message grants an uplink resource allocation. Here, it is assumed that there is a TB stored at the user equipment apparatus 700 (e.g., in a Msg3 buffer). As discussed above, the TB may comprise a MAC PDU, the MAC PDU comprising one or more MAC subPDUs and/or one or more MAC CEs. In addition, the TB may include padding bits, for example in the form of a padding MAC subPDU.

The processor 705 determines whether there is a size mismatch between the stored TB and the uplink resource allocation (UL grant). If there is no size mismatch, then the processor 705 controls the transceiver 725 to send the stored TB. In one embodiment, if the processor 705 determines that there is a size mismatch, the processor 705 then ignores the RAR and controls the transceiver 725 to send a new RACH preamble (e.g., PRACH preamble 245).

In other embodiments, if the processor 705 determines that there is a size mismatch, the processor 705 then generates a new TB that matches the size of the uplink resource allocation. Here, the new TB contains at least a portion of the stored TB. Further, the processor 705 controls the transceiver 725 to send the new TB to the base unit using the uplink resource allocation.

In various embodiments, generating the new TB includes triggering, by the transmitter 730, RLC retransmission for each RLC PDU contained in the stored TB. Note that the RLC layer passes RLC PDUs to the MAC layer, where they are received as MAC SDUs. The MAC layer, in turn, adds a MAC header and (if applicable) adds padding to fit the MAC SDU to the transmission opportunity (e.g., TTI).

In some embodiments, the processor 705 may determine that the uplink resource allocation is larger than the stored TB. Here, the processor 705 may generate the new TB by appending padding bits to the content of the stored TB to generate the new TB. In other embodiments, the processor 705 generates the new TB by generating a second TB and appending the second TB to the stored TB. Here, the transceiver 725 sends the stored TB and the second TB in the new TB.

In certain embodiments, the processor 705 generates the new TB by reordering one or more MAC subPDUs contained within the new TB. In certain embodiments, the processor 705 generates the new TB by removing a padding MAC subPDU from the stored TB. In further embodiments, the processor 705 removes one or more MAC CE subPDUs from the stored TB while generating the new TB. Here, the processor 705 may also generate new MAC CE subPDUs when generating the new TB. For example, the MAC CEs may be become invalid when the new TB is generated, thus the processor 705 removes the old MAC CEs and generates new MAC CEs.

In some embodiments, the processor 705 may determine that the uplink resource allocation is smaller than the stored TB. In such embodiments, the processor 705 may generate the new TB by invoking a logical channel prioritization ("LCP") procedure. In certain such embodiments, the new TB includes an indication that the uplink resource allocation is smaller than the stored TB. In one embodiment, the indication includes a buffer status report which indicates an amount of data stored in a Msg3 buffer. In another embodiment, the indication includes a one-bit flag, e.g., in a MAC header.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media. In some embodiments, the memory 710 stores data relating to handling TB size mismatch during RACH, for example storing a data protection policy and the like. In certain embodiments, the memory 710 also stores program code and related data, such as an operating system ("OS") or other controller algorithms operating on the user equipment apparatus 700 and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, may include any known electronically controllable display or display device. The output device 720 may be designed to output visual, audible, and/or haptic signals. In some embodiments, the output device 720 includes an electronic display capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, all or portions of the output device 720 may be located near the input device 715.

As discussed above, the transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver 725 (or portions thereof) at particular times in order to send and receive messages.

In various embodiments, the transceiver 725 includes at least one transmitter 730 and at least one receiver 735. One or more transmitters 730 may be used to provide UL communication signals to a base unit 121. Similarly, one or more receivers 735 may be used to receive DL communication signals from the base unit 121, as described herein. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an application specific integrated circuit ("ASIC"), or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
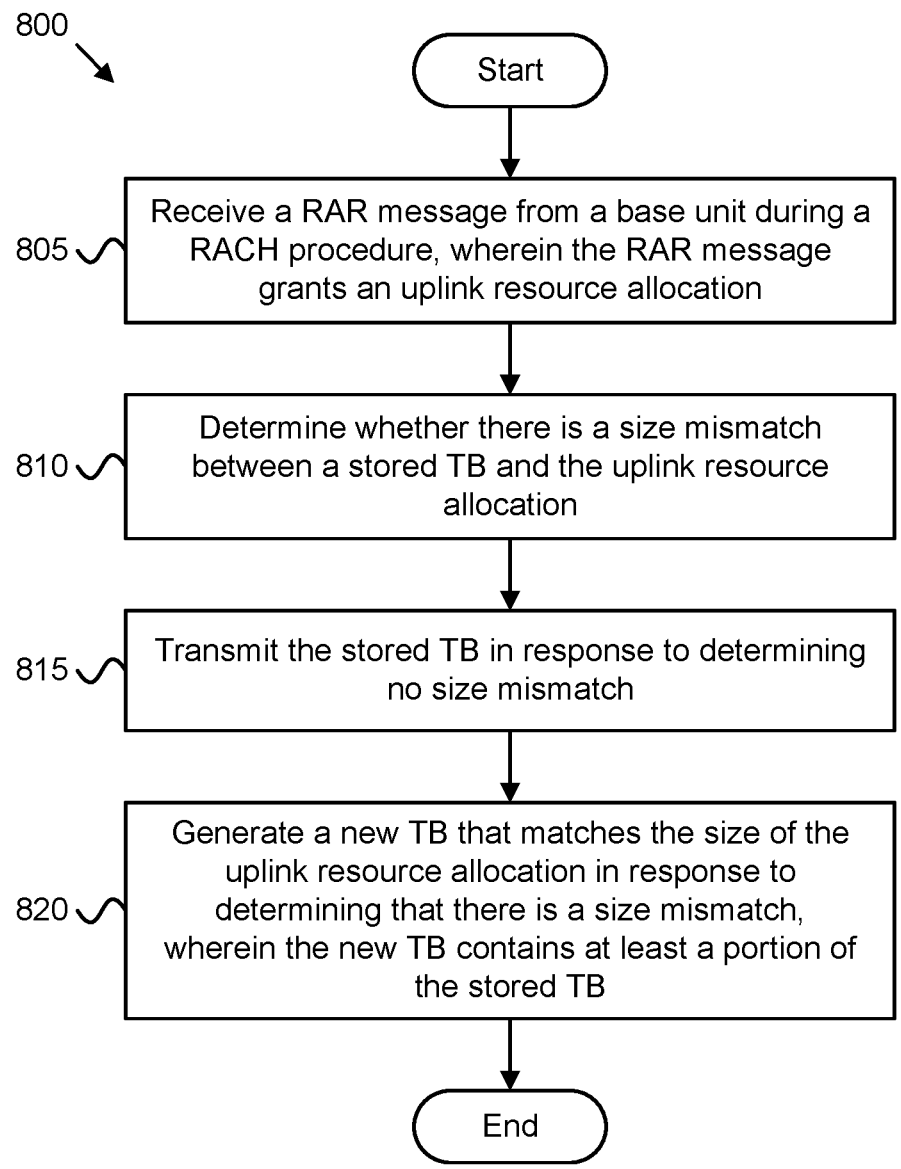
FIG. 8 is a flowchart diagram illustrating one embodiment of a method for handling TB size mismatch during RACH procedure.

FIG. 8 depicts a method 800 for handling TB size mismatch during RACH procedure, according to embodiments of the disclosure. In some embodiments, the method 800 is performed by an apparatus, such as the remote unit 105, the UE 205, the UE 305, the UE 405, the UE 605, and/or the user equipment apparatus 700. In certain embodiments, the method 800 may be performed by a processor executing program code, for example, a microcontroller, a microprocessor, a CPU, a GPU, an auxiliary processing unit, a FPGA, or the like.

The method 800 begins and receives 805, via a receiver, a RAR message from a base unit during a RACH procedure, wherein the RAR message grants an uplink resource allocation. The method 800 includes determining 810 whether there is a size mismatch between a stored transport block ("TB") and the uplink resource allocation and transmitting 815, via a transmitter, the stored TB in response to determining no size mismatch. The method 800 includes generating 820 a new TB that matches the size of the uplink resource allocation in response to determining that there is a size mismatch, wherein the new TB contains at least a portion of the stored TB. The method 800 ends.

Figure 9:
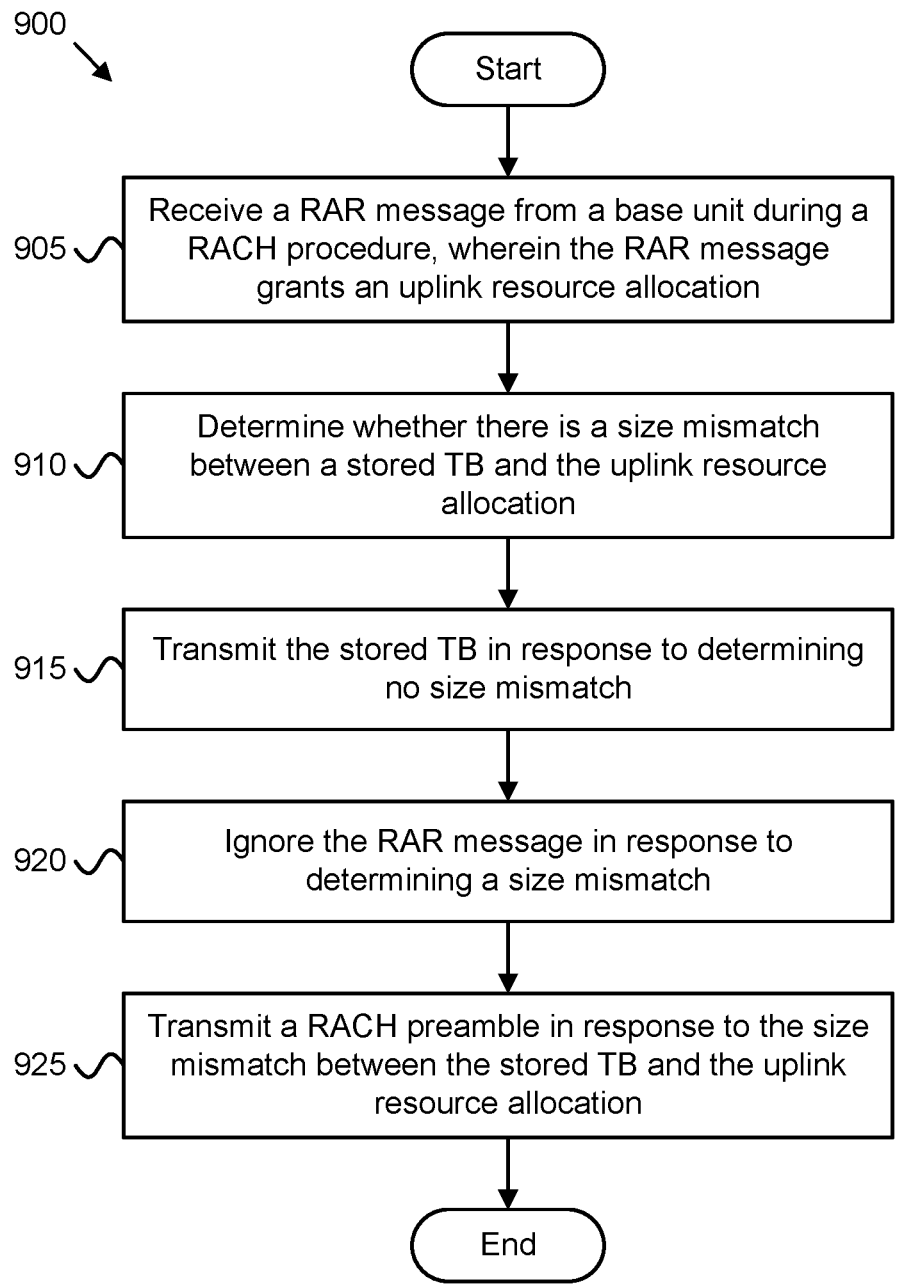
FIG. 9 is a flowchart diagram illustrating another embodiment of a method for handling TB size mismatch during RACH procedure.

FIG. 9 depicts a method 900 for handling TB size mismatch during RACH procedure, according to embodiments of the disclosure. In some embodiments, the method 900 is performed by an apparatus, such as the remote unit 105, the UE 205, the UE 305, the UE 405, the UE 605, and/or the user equipment apparatus 700. In certain embodiments, the method 900 may be performed by a processor executing program code, for example, a microcontroller, a microprocessor, a CPU, a GPU, an auxiliary processing unit, a FPGA, or the like.

The method 900 begins and receives 905 a RAR message from a base unit during a RACH procedure, wherein the RAR message grants an uplink resource allocation. The method 900 includes determining 910 whether there is a size mismatch between a stored transport block ("TB") and the uplink resource allocation and transmitting 915 the stored TB in response to determining no size mismatch. In response to determining a size mismatch between the stored TB and the uplink resource allocation, the method 900 includes ignoring 920 the RAR message in response and transmitting 925 a random access preamble in response to the size mismatch. The method 900 ends.

Figure 10:
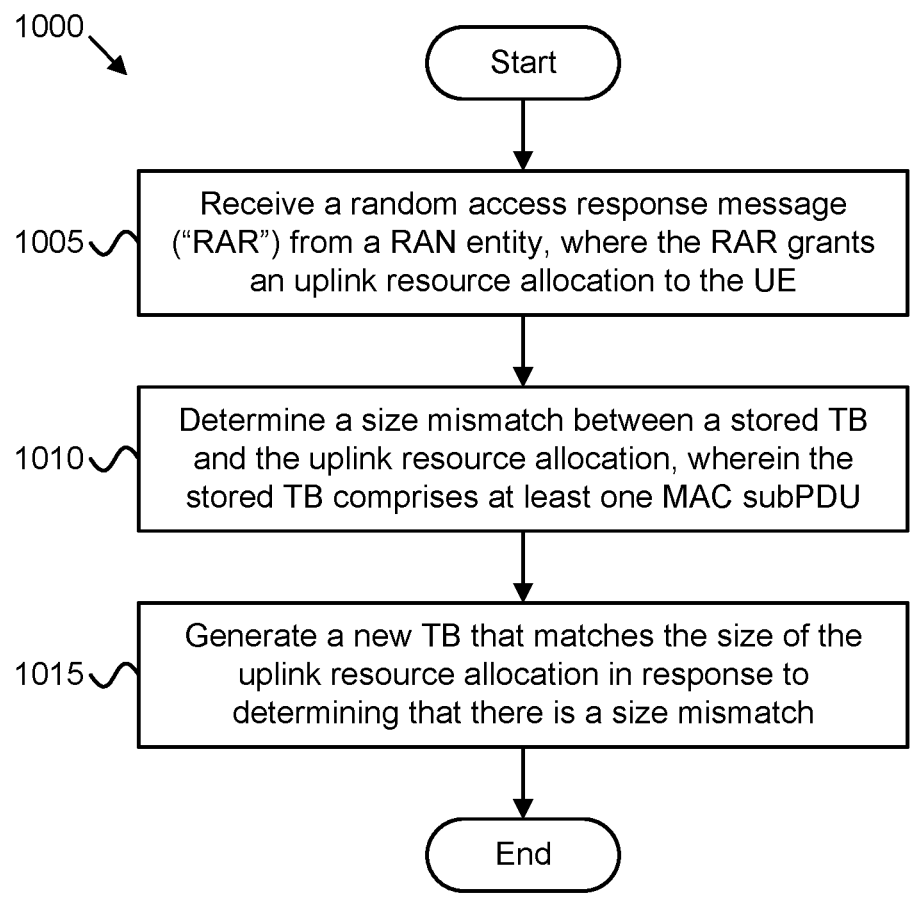
FIG. 10 is a flowchart diagram illustrating a further embodiment of a method for handling TB size mismatch during RACH procedure.

FIG. 10 depicts one embodiment of a method 1000 for handling TB size mismatch during RACH procedure, according to embodiments of the disclosure. In various embodiments, the method 1000 is performed by a remote unit 105, the UE 205, the UE 305, the UE 405, the UE 605, and/or the user equipment apparatus 700. In some embodiments, the method 1000 is performed by a processor, such as a microcontroller, a microprocessor, a CPU, a GPU, an auxiliary processing unit, a FPGA, or the like.

The method 1000 begins and receives 1005 a random access response message from a RAN entity, where the random access response message grants an uplink resource allocation to the UE. The method 1000 includes determining 1010 a size mismatch between a stored TB and the uplink resource allocation, wherein the stored TB comprises at least one MAC subPDU. The method 1000 includes generating 1015 a new TB that matches the size of the uplink resource allocation in response to determining that there is a size mismatch. The method 1000 ends.

Disclosed herein is a first apparatus for handling TB size mismatch during RACH procedure, according to embodiments of the disclosure. The first apparatus may be implemented by a User Equipment device, such as the remote unit 105, the UE 205, the UE 305, the UE 405, the UE 605, and/or the user equipment apparatus 700, described above. The first apparatus includes a processor and a transceiver (i.e., implementing a radio interface) that receives a random access response ("RAR") message from a RAN entity, where the RAR message grants an uplink resource allocation to the UE. The processor determines a size mismatch between a stored TB and the uplink resource allocation, where the stored TB includes at least one MAC subPDU. In response to determining that there is a size mismatch, the processor generates a new TB that matches the size of the uplink resource allocation, where generating the new TB includes appending at least one MAC subPDU.

In various embodiments, the transceiver transmits the new TB to the RAN entity. In some embodiments, the stored TB is stored in a Msg3 buffer and is generated for a CBRA procedure. In some embodiments, generating the new TB includes appending a MAC subPDU with padding. In certain embodiments, a size of the MAC subPDU with padding is equal to a difference between a size of the stored TB and a size of the uplink resource allocation.

In some embodiments, generating the new TB includes generating a second TB from data pending in the UE for transmission and appending the second TB to the stored TB, said second TB including the appended at least one MAC subPDU. In certain embodiments, generating the second TB includes invoking an LCP procedure.

In certain embodiments, generating the new TB includes reordering one or more MAC subPDUs contained within the new TB. In certain embodiments, generating the new TB further includes removing a padding MAC subPDU from the stored TB prior to generating the second TB. In such embodiments, generating the new TB may further include removing at least one CE MAC subPDU from the stored TB prior to generating the second TB.

Disclosed herein is a first method for handling TB size mismatch during RACH procedure, according to embodiments of the disclosure. The first method may be performed by a User Equipment device, such as the remote unit 105, the UE 205, the UE 305, the UE 405, the UE 605, and/or the user equipment apparatus 700, described above. The first method includes receiving a random access response message from a RAN entity, where the random access response message grants an uplink resource allocation to the UE. The first method includes determining a size mismatch between a stored TB and the uplink resource allocation, where the stored TB includes at least one MAC subPDU. The first method further includes generating a new TB that matches the size of the uplink resource allocation in response to determining that there is a size mismatch, where generating the new TB includes appending at least one MAC subPDU.

In some embodiments, the stored TB is stored in a Msg3 buffer and is generated for a CBRA procedure, where the transceiver transmits the new TB to the RAN entity. In some embodiments, generating the new TB includes appending a MAC subPDU with padding. In certain embodiments, a size of the MAC subPDU with padding is equal to a difference between a size of the stored TB and a size of the uplink resource allocation.

In some embodiments, generating the new TB includes generating a second TB from data pending in the UE for transmission and appending the second TB to the stored TB, said second TB including the appended at least one MAC subPDU. In certain embodiments, generating the second TB includes invoking a LCP procedure.

In certain embodiments, generating the new TB includes reordering one or more MAC subPDUs contained within the new TB. In certain embodiments, generating the new TB further includes removing a padding MAC subPDU from the stored TB prior to generating the second TB. In such embodiments, generating the new TB may further include removing at least one CE MAC subPDU from the stored TB prior to generating the second TB.

Disclosed herein is a second apparatus for handling TB size mismatch during RACH procedure, according to embodiments of the disclosure. The second apparatus may be implemented by a User Equipment device, such as the remote unit 105, the UE 205, the UE 305, the UE 405, the UE 605, and/or the user equipment apparatus 700, described above. The second apparatus includes a processor and a transceiver (i.e., implementing a radio interface) that receives a random access response message from a RAN entity, where the random access response message grants an uplink resource allocation to the UE. The processor determines a size mismatch between a stored TB and the uplink resource allocation, where the stored TB includes at least one MAC subPDU. In response to determining that there is a size mismatch, the processor generates a new TB that matches the size of the uplink resource allocation.

In some embodiments, the stored TB is stored in a Msg3 buffer and is generated for a CBRA procedure. In such embodiments, the processor controls the transceiver to transmit the new TB to the RAN entity. In some embodiments, generating the new TB includes invoking a LCP procedure. In such embodiments, the uplink resource allocation may be smaller than the stored TB.

In certain embodiments, the new TB includes an indication that the uplink resource allocation is smaller than the stored TB. In one embodiment, the indication includes a buffer status report which indicates an amount of data stored in a Msg3 buffer. In another embodiment, the indication includes a one-bit flag in a MAC header.

In some embodiments, the transceiver further receives a second uplink resource allocation and transmits the stored TB using the second uplink resource allocation. In certain embodiments, a size of the second uplink resource allocation may be larger than a size of the stored TB. In such embodiments, the processor may generate a new TB that matches the size of the uplink resource allocation by appending at least one MAC subPDU.

In certain embodiments, generating the new TB includes appending a MAC subPDU with padding. In certain embodiments, generating the new TB further includes performing one or more of: reordering one or more MAC subPDUs contained within the stored TB, removing a padding MAC subPDU from the stored TB, and removing one or more CE MAC subPDUs from the stored TB.

Disclosed herein is a second method for handling TB size mismatch during RACH procedure, according to embodiments of the disclosure. The second method may be performed by a User Equipment device, such as the remote unit 105, the UE 205, the UE 305, the UE 405, the UE 605, and/or the user equipment apparatus 700, described above. The second method includes receiving a random access response message from a RAN entity and determining a size mismatch between a stored TB and the uplink resource allocation, where the stored TB includes at least one MAC subPDU and where the random access response message grants an uplink resource allocation to the UE. The second method includes generating a new TB that matches the size of the uplink resource allocation in response to determining that there is a size mismatch.

In some embodiments, the stored TB is stored in a Msg3 buffer and is generated for a CBRA procedure. In such embodiments, the second method further includes transmitting the new TB to the RAN entity. In some embodiments, generating the new TB includes invoking a LCP procedure. In such embodiments, the uplink resource allocation may be smaller than the stored TB.

In certain embodiments, the new TB includes an indication that the uplink resource allocation is smaller than the stored TB. In one embodiment, the indication includes a buffer status report which indicates an amount of data stored in a Msg3 buffer. In another embodiment, the indication includes a one-bit flag in a MAC header.

In some embodiments, the second method includes receiving a second uplink resource allocation and transmitting the stored TB using the second uplink resource allocation. In certain embodiments, a size of the second uplink resource allocation may be larger than a size of the stored TB. In such embodiments, the second method may include generating a new TB that matches the size of the uplink resource allocation by appending at least one MAC subPDU.

In certain embodiments, generating the new TB includes appending a MAC subPDU with padding. In certain embodiments, generating the new TB further includes performing one or more of: reordering one or more MAC subPDUs contained within the stored TB, removing a padding MAC subPDU from the stored TB, and removing one or more CE MAC subPDUs from the stored TB.

Disclosed herein is a third apparatus for handling TB size mismatch during RACH procedure. The third apparatus may be implemented by a UE, such as the remote unit 105, the UE 205, the UE 305, the UE 405, the UE 605, and/or the user equipment apparatus 700. The third apparatus includes a transceiver that receives a random access response message from a base unit during a random access procedure, wherein the random access response message grants an uplink resource allocation. The third apparatus includes a processor that determines whether there is a size mismatch between a stored transport block ("TB") and the uplink resource allocation. In response to determining there is no size mismatch, the processor controls the transceiver to send the stored TB. In response to determining that there is a size mismatch, the processor generates a new TB that matches the size of the uplink resource allocation, wherein the new TB contains at least a portion of the stored TB.

The processor controls the transceiver to send the new TB to the base unit using the uplink resource allocation. In some embodiments, the stored TB is stored in a Msg3 buffer. In various embodiments, the transceiver includes a transmitter and a receiver, wherein generating the new TB includes triggering, by the transmitter, radio link control ("RLC") retransmission for each RLC protocol data unit ("PDU") contained in the stored TB.

In some embodiments, determining whether there is a size mismatch between the stored TB and the uplink resource allocation includes determining that the uplink resource allocation is larger than the stored TB. In such embodiments, the processor generates the new TB by appending padding bits to the content of the stored TB to generate the new TB.

In certain embodiments, the processor generates the new TB by generating a second TB and appending the second TB to the stored TB, wherein the stored TB and the second TB are sent in the new TB. In one embodiment, generating the new TB includes reordering one or more MAC subPDUs contained within the new TB. In another embodiment, generating the new TB further includes removing a padding MAC subPDU from the stored TB. In further embodiments, generating the new TB includes removing one or more control element ("CE") MAC subPDUs from the stored TB.

In some embodiments, determining whether there is a size mismatch between the stored TB and the uplink resource allocation includes determining that the uplink resource allocation is smaller than the stored TB. In such embodiments, the processor may generate the new TB by invoking a logical channel prioritization ("LCP") procedure. In certain such embodiments, the new TB includes an indication that the uplink resource allocation is smaller than the stored TB. In one embodiment, the indication includes a buffer status report which indicates an amount of data stored in a Msg3 buffer. In another embodiment, the indication includes a one-bit flag.

Disclosed herein is a third method for handling TB size mismatch during RACH procedure. The third method may be performed by a UE, such as the remote unit 105, the UE 205, the UE 305, the UE 405, the UE 605, and/or the user equipment apparatus 700. The third method includes receiving, via a receiver, a random access response message from a base unit during a random access procedure, wherein the random access response message grants an uplink resource allocation. The third method includes determining whether there is a size mismatch between a stored transport block ("TB") and the uplink resource allocation and transmitting, via a transmitter, the stored TB in response to determining no size mismatch. The third method includes generating a new TB that matches the size of the uplink resource allocation in response to determining that there is a size mismatch, wherein the new TB contains at least a portion of the stored TB.

In some embodiments, the stored TB is stored in a Msg3 buffer. In various embodiments, the third method includes transmitting the new TB to the base unit. In certain embodiments, generating the new TB includes triggering, via the transmitter, radio link control ("RLC") retransmission for each RLC protocol data unit ("PDU") contained in the stored TB.

In some embodiments, determining whether there is a size mismatch between the stored TB and the uplink resource allocation includes determining that the uplink resource allocation is larger than the stored TB. In such embodiments, generating the new TB may include including the content of the stored TB within the new TB and appending padding bits.

In certain embodiments, generating the new TB includes generating a second TB and appending the second TB to the stored TB and transmitting the stored TB and the second TB in the new TB. In one embodiment, generating the new TB includes reordering one or more medium access control ("MAC") protocol data subunits ("subPDUs") contained within the new TB. In another embodiment, generating the new TB includes removing a padding MAC subPDU from the stored TB. In further embodiments, generating the new TB includes removing one or more control element ("CE") MAC subPDUs from the stored TB.

In some embodiments, determining whether there is a size mismatch between the stored TB and the uplink resource allocation includes determining that the uplink resource allocation is smaller than the stored TB. In such embodiments, generating the new TB includes invoking a logical channel prioritization ("LCP") procedure. In certain embodiments, the new TB includes an indication that the uplink resource allocation is smaller than the stored TB. In one embodiment, the indication includes a buffer status report which indicates an amount of data stored in a Msg3 buffer. In another embodiment, the indication includes a one-bit flag.

Disclosed herein is a fourth apparatus for handling TB size mismatch during RACH procedure. The fourth apparatus may be implemented by a UE, such as the remote unit 105, the UE 205, the UE 305, the UE 405, the UE 605, and/or the user equipment apparatus 700. The fourth apparatus includes a transceiver that receives a random access response message from a base unit during a random access procedure, wherein the random access response message grants an uplink resource allocation. The fourth apparatus includes a processor that determines whether there is a size mismatch between a stored transport block ("TB") and the uplink resource allocation. In response to determining no size mismatch, the processor controls the transceiver to transmits the stored TB. In response to determining a size mismatch between the stored TB and the uplink resource allocation, the processor ignores the random access response message in response, wherein the transceiver transmits a random access preamble in response to the size mismatch.

Disclosed herein is a fourth method for handling TB size mismatch during RACH procedure. The fourth method may be performed by a UE, such as the remote unit 105, the UE 205, the UE 305, the UE 405, the UE 605, and/or the user equipment apparatus 700. The fourth method includes receiving a random access response message from a base unit during a random access procedure, wherein the random access response message grants an uplink resource allocation. The fourth method includes determining whether there is a size mismatch between a stored transport block ("TB") and the uplink resource allocation and transmitting the stored TB in response to determining no size mismatch. In response to determining a size mismatch between the stored TB and the uplink resource allocation, the fourth method includes ignoring the random access response message in response and transmitting a random access preamble in response to the size mismatch.

Disclosed herein is a system for handling TB size mismatch during RACH procedure, according to embodiments of the disclosure. The system may be implemented by an entity/device in a RAN (such as the base unit 121, the RAN node 210, the RAN node 310, the RAN node 410, and/or the RAN node 610, described above) and a UE (such as the remote unit 105, the UE 205, the UE 305, the UE 405, the UE 605, and/or the user equipment apparatus 700, described above). The RAN entity that transmits a random access response message to the UE, where the random access response message grants an uplink resource allocation to the UE. The UE determines a size mismatch between the stored TB and the uplink resource allocation and generates a new TB that matches the size of the uplink resource allocation in response to determining that there is a size mismatch.

In some embodiments, the UE generates the new TB according to one or more embodiments detailed in the first method, above. In some embodiments, the UE generates the new TB according to one or more embodiments detailed in the second method, above.

In some embodiments, the UE generates the new TB according to one or more embodiments detailed in the third method, above. In some embodiments, the UE generates the new TB according to one or more embodiments detailed in the fourth method, above.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A User Equipment ("UE") apparatus comprising:
a processor; and
a memory coupled to the processor, the processor configured to cause the apparatus to:
receive a random access response message from a Radio Access Network ("RAN") entity, wherein the random access response message grants an uplink resource allocation to the UE apparatus;
determine a size mismatch between a stored Transport Block ("TB") and the uplink resource allocation, wherein the stored TB comprises at least one medium access control ("MAC") protocol data subunit ("subPDU"); and
generate a new TB that matches the size of the uplink resource allocation in response to determining that there is a size mismatch,
wherein, to generate the new TB, the processor is configured to cause the apparatus to perform one or more of:
reorder one or more MAC subPDUs contained within the stored TB,
remove, from the stored TB, a padding MAC subPDU, or
remove, from the stored TB, one or more MAC subPDUs that include a MAC control element ("MAC-CE").

2. The UE apparatus of claim 1, wherein the stored TB is stored in a Msg3 buffer and is generated for a Contention-Based Random-Access ("CBRA") procedure, and wherein the processor is configured to cause the UE apparatus to transmit the new TB to the RAN entity.

3. The UE apparatus of claim 1, wherein, to generate the new TB, the processor is configured to cause the UE apparatus to append a MAC subPDU with padding.

4. The UE apparatus of claim 3, wherein a size of the MAC subPDU with padding is equal to a difference between a size of the stored TB and a size of the uplink resource allocation.

5. The UE apparatus of claim 1, wherein, to generate the new TB, the processor is configured to cause the UE apparatus to:
generate a second TB from data pending in the UE apparatus for transmission; and
append the second TB to the stored TB.

6. The UE apparatus of claim 1, wherein, to generate the new TB, the processor is configured to cause the UE apparatus to append at least one MAC subPDU to the stored TB.

7. The UE apparatus of claim 5, wherein the processor is configured to cause the UE apparatus to remove the padding MAC subPDU from the stored TB prior to generating the second TB.

8. The UE apparatus of claim 5, wherein the processor is configured to cause the UE apparatus to remove the one or more MAC subPDUs that include the MAC CE from the stored TB prior to generating the second TB.

9. The UE apparatus of claim 5, wherein, to generate the second TB, the processor is configured to cause the UE apparatus to invoke a logical channel prioritization ("LCP") procedure.

10. A method performed by a User Equipment ("UE"), the method comprising:
receiving a random access response message from a Radio Access Network ("RAN") entity, wherein the random access response message grants an uplink resource allocation to the UE;

determining a size mismatch between a stored Transport Block ("TB") and the uplink resource allocation, wherein the stored TB comprises at least one medium access control ("MAC") protocol data subunit ("subPDU"); and generating a new TB that matches the size of the uplink resource allocation in response to determining that there is a size mismatch, wherein generating the new TB further comprises performing one or more of:

reordering one or more MAC subPDUs contained within the stored TB, removing, from the stored TB, a padding MAC subPDU, or removing, from the stored TB, one or more MAC subPDUs that include a MAC control element ("MAC-CE").

11. The method of claim 10, wherein the stored TB is stored in a Msg3 buffer and is generated for a Contention-Based Random-Access ("CBRA") procedure, the method further comprising transmitting the new TB to the RAN entity.

12. The method of claim 10, wherein generating the new TB comprises invoking a logical channel prioritization ("LCP") procedure, wherein the uplink resource allocation is smaller than the stored TB.

13. The method of claim 12, wherein the new TB comprises an indication that the uplink resource allocation is smaller than the stored TB.

14. The method of claim 13, wherein the indication comprises a buffer status report which indicates an amount of data stored in a Msg3 buffer.

15. The method of claim 13, wherein the indication comprises a one-bit flag in a MAC header.

16. The method of claim 13, further comprising receiving a second uplink resource allocation and transmitting the stored TB using the second uplink resource allocation.

17. The method of claim 16, wherein a size of the second uplink resource allocation is larger than a size of the stored TB, the method further comprising:

generating a new TB that matches the size of the uplink resource allocation by appending at least one MAC subPDU.

18. The method of claim 17, wherein generating the new TB comprises appending a MAC subPDU with padding.

19. A system comprising:

a User Equipment ("UE"); and a Radio Access Network ("RAN") entity that transmits a random access response message to the UE, wherein the random access response message grants an uplink resource allocation to the UE, wherein the UE further:

determines a size mismatch between the stored TB and the uplink resource allocation, wherein the stored TB comprises at least one medium access control ("MAC") protocol data subunit ("subPDU"); and generates a new TB that matches the size of the uplink resource allocation in response to determining that there is a size mismatch, wherein generating the new TB comprises performing one or more of:

reordering one or more MAC subPDUs contained within the stored TB, removing, from the stored TB, a padding MAC subPDU, or removing, from the stored TB, one or more MAC subPDUs that include a MAC control element ("MAC-CE").

* * * * *